E. SCHNEIDER.
GUN CARRIAGE FRAME.
APPLICATION FILED FEB. 28, 1919.
1,336,926.
Patented Apr. 13, 1920.
7 SHEETS—SHEET 2.
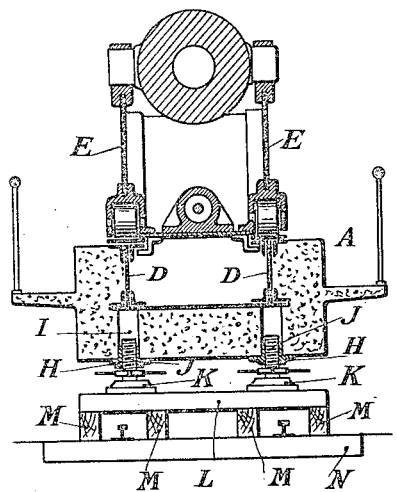
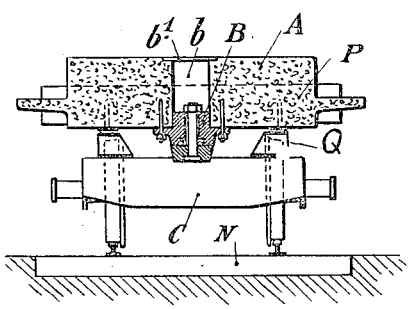
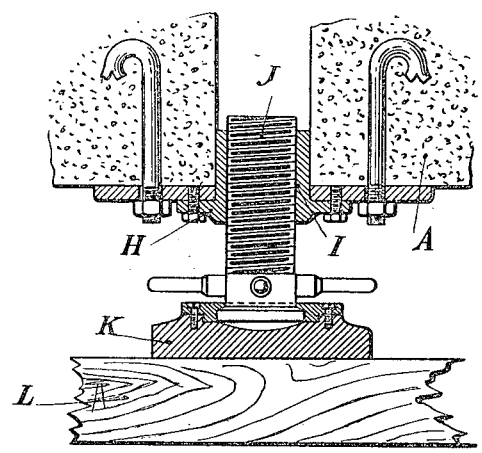
Inventor.
Eugène Schneider
By, Mauro, Cameron, Lewis & Massie
Attorneys

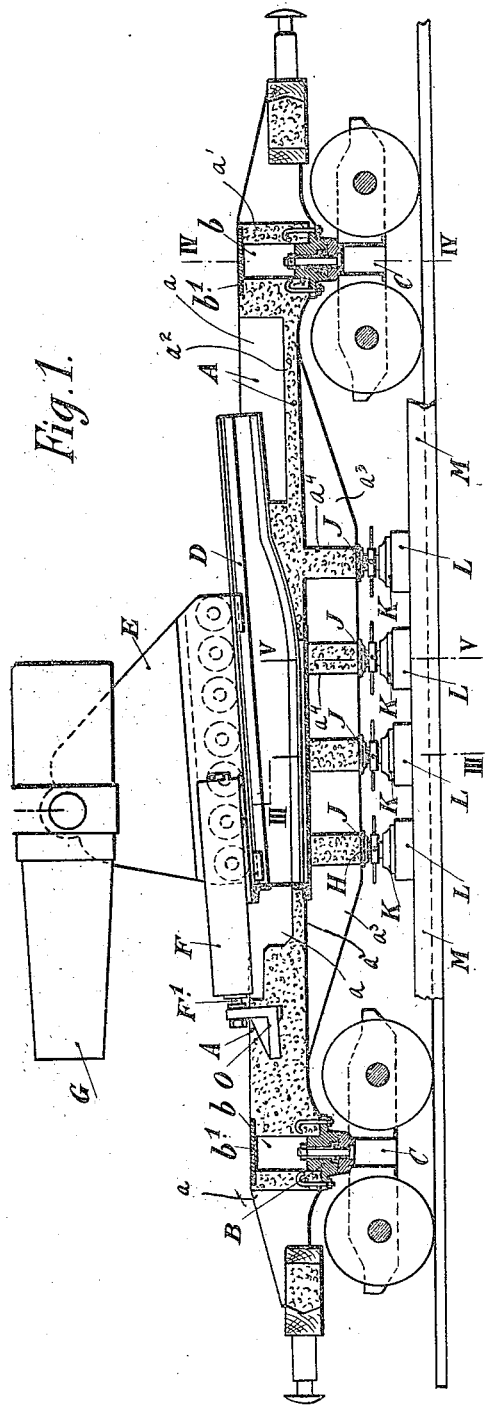
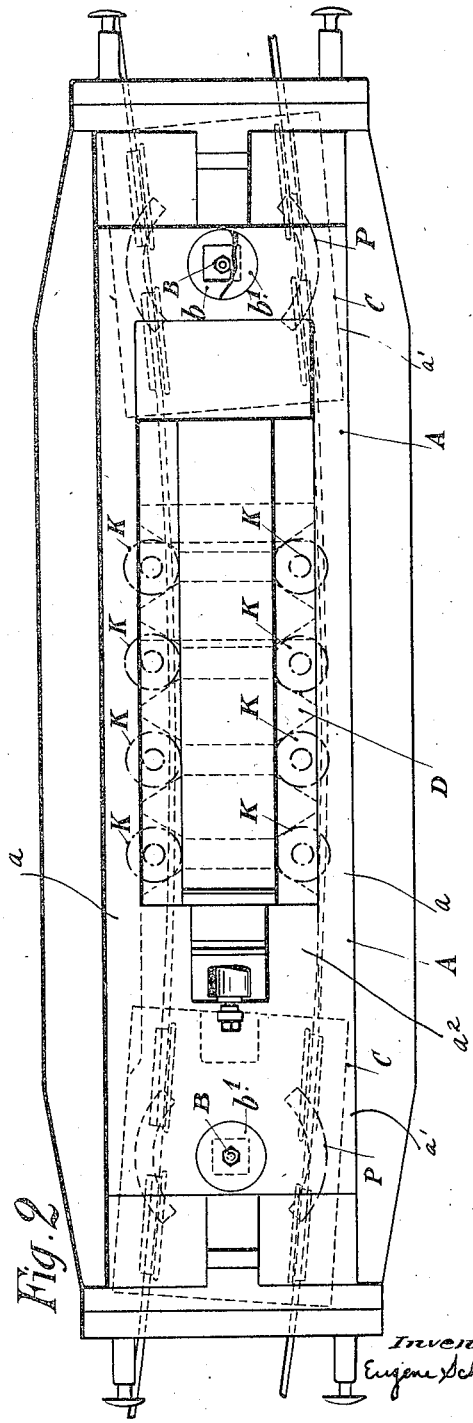

E. SCHNEIDER.
GUN CARRIAGE FRAME.
APPLICATION FILED FEB. 28, 1919.

1,336,926.

Patented Apr. 13, 1920.
7 SHEETS—SHEET 3.

Inventor.
Eugene Schneider
by, Mauro, Cameron, Lewis & Massie
Attorneys.

E. SCHNEIDER.
GUN CARRIAGE FRAME.
APPLICATION FILED FEB. 28, 1919.
1,336,926.
Patented Apr. 13, 1920.
7 SHEETS—SHEET 4.
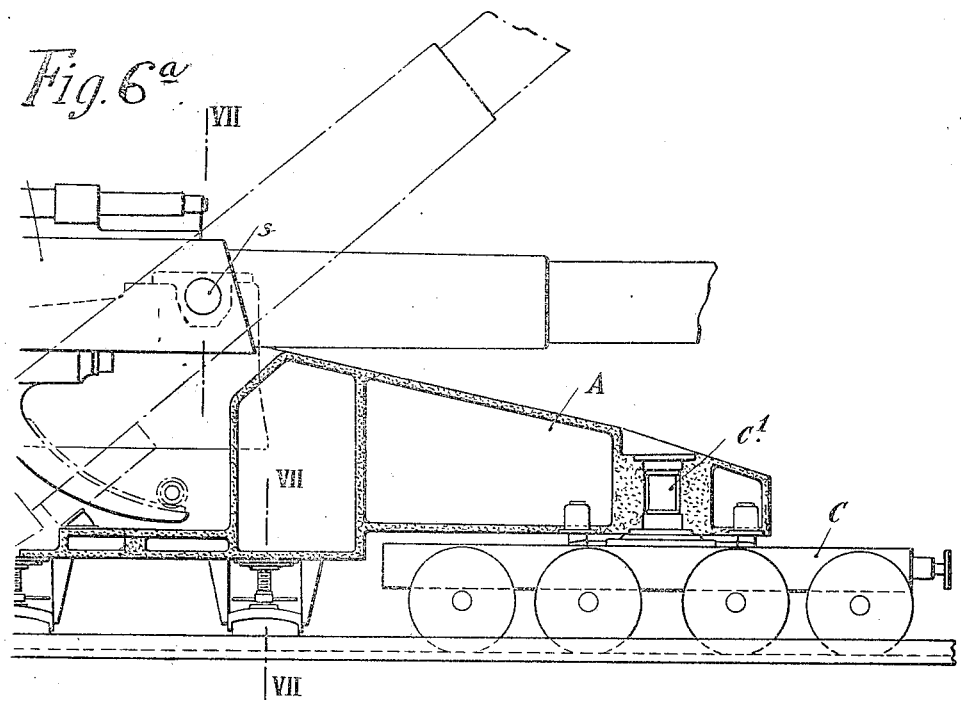
Fig. 6ª
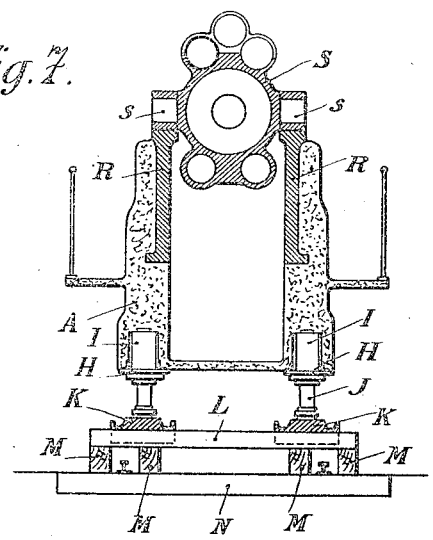
Fig. 7.

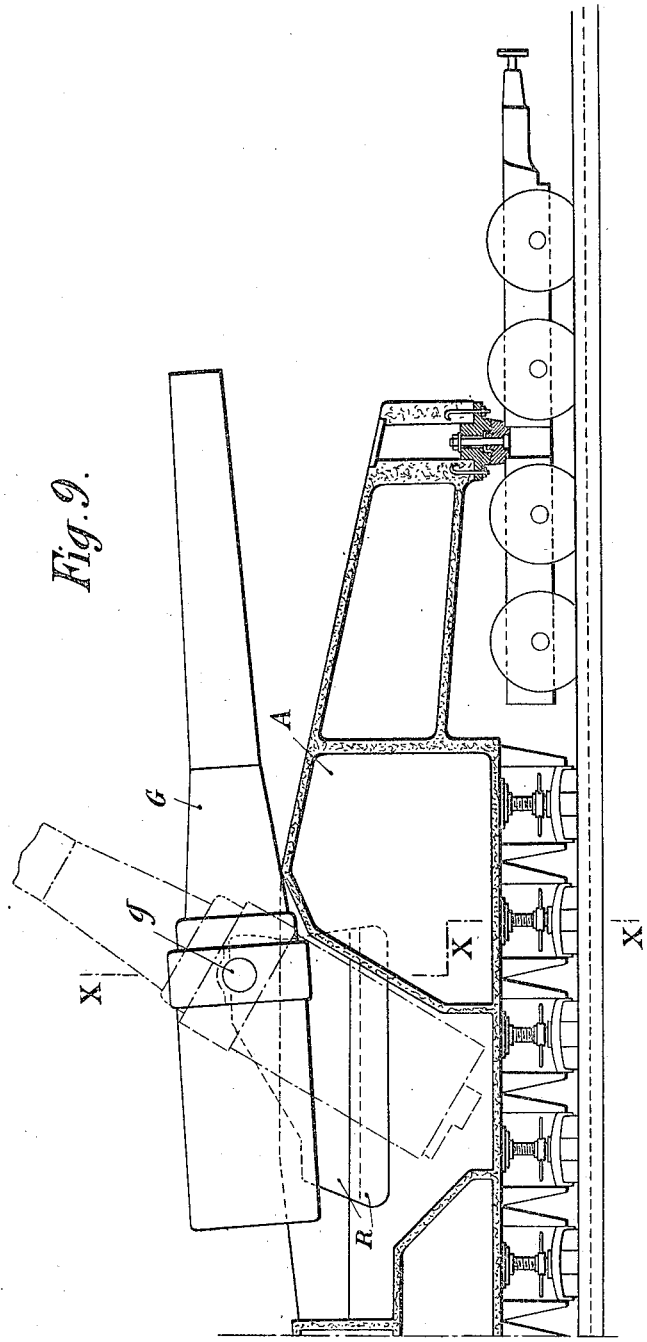

E. SCHNEIDER.
GUN CARRIAGE FRAME.
APPLICATION FILED FEB. 28, 1919.

1,336,926.

Patented Apr. 13, 1920.
7 SHEETS—SHEET 6.

Inventor:
Eugene Schneider
by,
Mauro, Cameron, Lewis & Massie
Attorneys.

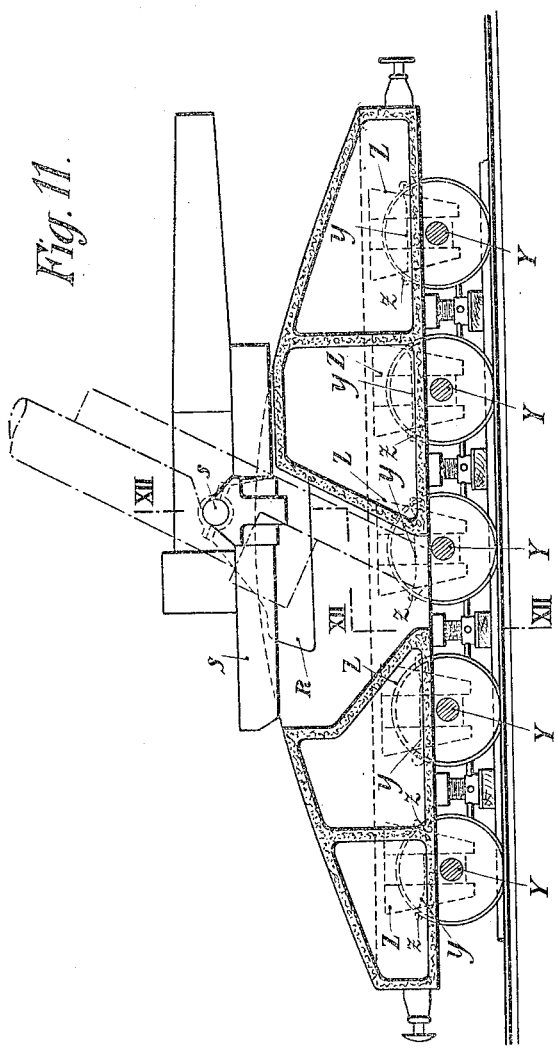

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

GUN-CARRIAGE FRAME.

1,336,926.  Specification of Letters Patent.  Patented Apr. 13, 1920.

Application filed February 28, 1919. Serial No. 279,880.

*To all whom it may concern:*

Be it known that I, EUGÈNE SCHNEIDER, citizen of the French Republic, and a resident of 42 Rue d'Anjou, Paris, France, have invented a new and useful Improved Gun-Carriage Frame, which invention is fully set forth in the following specification.

This invention has for its object to provide an improved framing for the carriages of guns of large caliber.

The improved frame is characterized by the feature that it comprises a girder-like structure of reinforced cement, into the mass of which there are incorporated wholly or partly, and either directly or by means of suitable anchoring devices, the following elements:

1. The parts for supporting the frame on the supporting wheeled axles; such are for instance the inner or outer parts whereby the frame is mounted pivotally on bogies; or devices for connecting the frame to the suspensory devices carried by trucks or ordinary wheeled axles.

2. The direct or indirect supports for the gun, that is to say, according to the type of carriage employed, a bedplate or saddle upon which can slide or is pivoted a gun mount, or gun brackets, or parts of guns brackets forming or carrying bearings for the trunnions of the gun or of the cradle.

3. Fixed elements, such as the nuts or screws of a series of screwjacks carrying shoes for supporting the girder-like structure during firing, upon a wooden or other platform placed upon the firing track.

The invention also comprises the arrangement of elastic devices or the formation of sliding surfaces between the supporting parts carried by the bogies or other wheeled axles, and the complementary parts carried by the frame of reinforced cement, in such a manner as to allow the said frame to execute as a result of the firing, a limited sliding movement relatively to its supports, with an automatic return into its normal position.

Various constructional forms of this invention are illustrated by way of example in the accompanying drawings.

Figures 1 to 5 show a first constructional example.

Fig. 1 is a vertical longitudinal section along the axis of the frame, showing the gun in side elevation.

Fig. 2 is a corresponding plan, the gun pedestal and the gun barrel having been removed.

Figs. 3 and 4 are sections respectively on the lines III—III and IV—IV of Fig. 1.

Fig. 5 is a vertical section drawn to a larger scale on the line V—V of Fig. 1.

Figure 6:
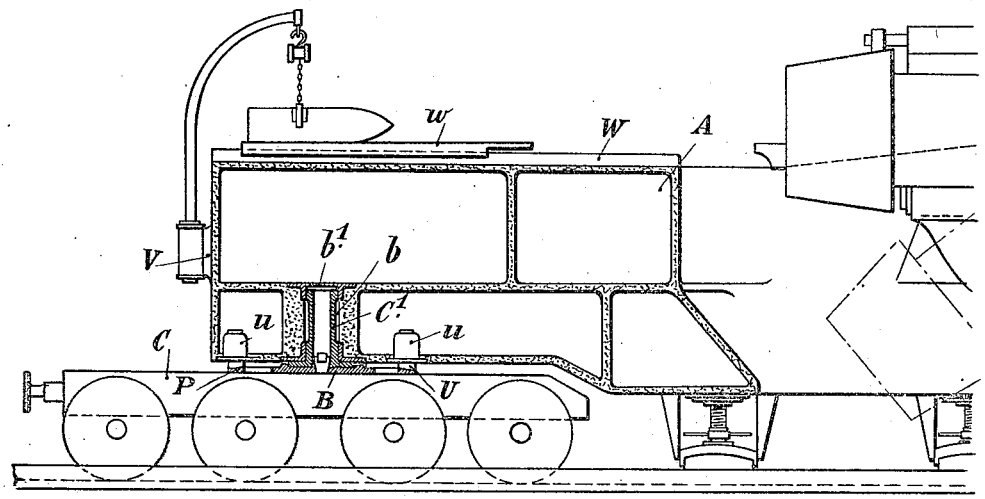
Figure 8:
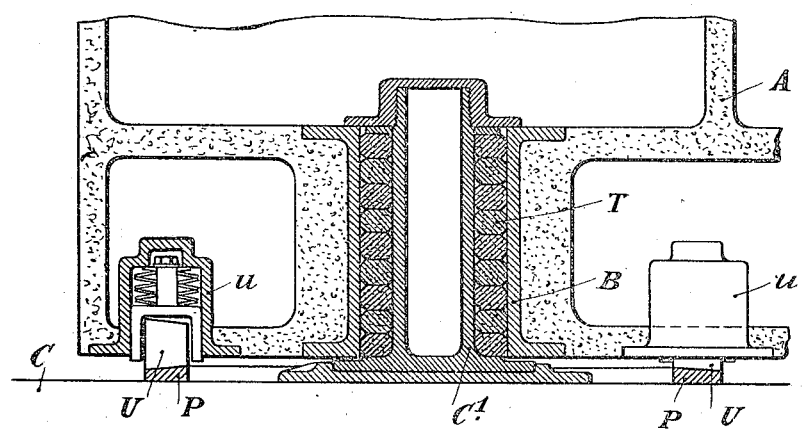
Figure 10:
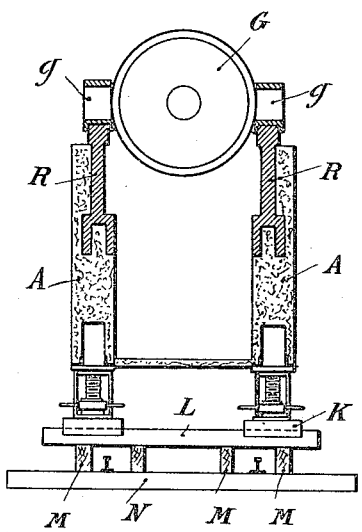
Figure 12:
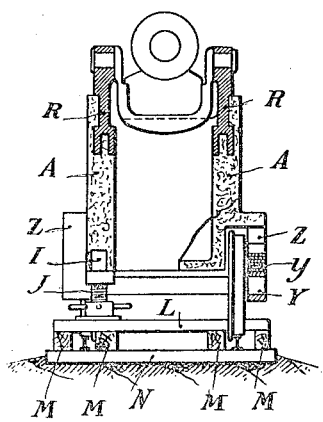

Figs. 6 and $6^a$, which are complements of each other, show a side elevation, partly in vertical section along the axis of the frame, of a second constructional form of the invention;

Fig. 7 is a cross section on the line VII—VII of Fig. $6^a$;

Fig. 8 is a cross-section of a detail drawn to a larger scale, illustrating a constructional form of the device for enabling the frame to have a limited sliding movement on its supporting wheeled axles;

Fig. 9 shows a side elevation, partly in vertical section along the axis of the frame, broken away at one end, of a modification of the constructional form of the invention shown in Figs. 6 and $6^a$;

Fig. 10 is a vertical cross-section on the line X—X of Fig. 9;

Fig. 11 is a vertical longitudinal section of another constructional example;

Fig. 12 is a vertical cross-section on the line XII—XII of Fig. 11.

As shown, A is a frame composed of reinforced cement in which are partially embedded or are anchored the elements B of any suitable known apparatus for mounting the frame pivotally on bogies C. Passages $b$ may be formed in the girder-like structure in line with the said pivots for the purpose of facilitating access to the latter. The tops of these passages may be normally closed by metal lids $b^1$ resting with their edges upon a ledge of corresponding shape formed in the cement.

The girder-like structure A of integral reinforced cement comprises the longitudinal side sills $a$ and end cross-sills $a'$ inclosing a horizontal platform $a^2$ having a central recess in which is seated, in part, the saddle D of the gun-mounting. Intermediate of their ends the side sills $a$ are dropped below the platform, as at $a^3$, and between these dropped portions extend the intermediate cross sills $a^4$ spaced apart. The dropped part of the side sills, together with the intermediate cross sills, provide for the frame an enlarged central body-part which, by its mass positioned directly beneath the gun-mounting, is particularly adapted to receive the direct shock of discharge.

In the girder-like structure A there is embedded in whole or in part a metal bedplate or saddle D of suitable inclination upon which the gun mount E is adapted to move in its recoil. The gun barrel G is journaled by means of trunnions in this mount.

In the girder A adjacent to the jointures of the side sills $a$ and the intermediate cross sills $a^4$ there are embedded or anchored metal parts H each constituting or receiving one of the elements, for instance the nut I, of a screwjack I—J, the other element or screw J of which carries a shoe K. During the firing, the frame A bears with these shoes K upon a wooden or other platform L which is placed upon beams M laid on the sleepers N of the firing track. It is to be understood that the shoes K are arranged preferably in line with the bedplate D, so that they transmit as directly as possible to the track, the strains produced by the firing.

In this example, one of the elements of a brake F—F¹ is fixed to the gun mount E. The complementary element, that is to say, the piston rod F¹ is attached to a bracket suitably anchored or partly embedded in the cement of the girder-like structure A.

Metal plates P having the shape of an arc of a circle may be anchored in the girder A, for the purpose of bearing, during the pivoting movements of the frame, upon corresponding supports Q (Fig. 4) provided on the bogies C. To provide proper clearance to the bogies the end-extensions of the main frame project in an elevated position from the upper part of the central body of the frame.

In the example shown in Figs. 6, 6ª and 7, the improved frame comprises as in the preceding example, a girder-like structure A of reinforced cement, in which are partly embedded or are anchored the outer elements B of an apparatus for allowing the frame to pivot on the bogies C. Pivots C¹ which are suitably fixed on the said bogies, are adapted to move in the said elements B.

In the girder-like structure A there are also embedded wholly or in part, gun brackets R that carry projecting therefrom or constituting by their upper projecting portions, bearings for the trunnions $s$ of a gun cradle S.

As in the preceding example, here also are metal elements H upon which are fixed the nuts I of screwjack I—J carrying shoes K by which the strains are transmitted to a platform L—M erected on the firing track.

As shown in detail in the modification illustrated by Fig. 8, elastic devices such as rubber rings T may be provided between the supporting elements B carried by the reinforced cement frame A and the corresponding elements C¹ carried by the bogies C or other supporting wheeled axles. During the firing, the girder A is thus enabled to execute a limited sliding movement on the supporting wheeled axles. The elasticity of the interposed elements T assure the automatic return of the girder into its normal position.

Normally, the support of the girder A, instead of being provided directly between the elements B and C¹, may be provided by a series of retractable rollers U adapted to move on circular tracks P carried by the bogies C. The boxes $u$ for guiding and receiving these rollers are embedded or anchored in the concrete of the girder A.

The girder A may serve for anchoring accessory parts, such as for instance a bracket V for a crane for handling the ammunition. It may also carry a rolling track W for a loading carriage $w$.

In the modification shown in Figs. 9 and 10 the gun brackets R which are partly embedded in the reinforced cement girder A, constitute bearings for the trunnions $g$ of the gun barrel G.

The reinforced cement girder A instead of being mounted on bogies or trucks, may be mounted on ordinary wheeled axles.

Figs. 11 and 12 show a constructional example in which the frame A of reinforced cement comprises parts for connecting it to suspensory devices, such as the leaf springs $y$ carried by the axle boxes of the ordinary wheeled axles Y. These connecting parts may consist as shown, of metal cheeks Z partly embedded or suitably anchored in the cement of the girder. In these cheeks Z are fixed the pins $z$ with which are engaged or upon which bear the suspension springs $y$.

What I claim is:—

1. In a car for carrying guns of large calibers during transportation and firing, an integral girder-like member of reinforced cement forming the main frame of the car, said frame having an enlarged central body-part and end-extensions of less thickness than said body-part, wheel-trucks mounted beneath the end-extensions of the frame, and the fixed member of a gun-mounting embedded in the body-part of the frame, said body-part by its position relative to said fixed member operating to receive the direct shock of discharge.

2. In a car for carrying guns of large calibers during transportation and firing, an integral girder-like member of reinforced cement forming the main frame of the car, said frame having an enlarged central body-part and end-extensions of less thickness than said body-part, wheel-trucks mounted beneath the end-extensions of the frame, the fixed member of a gun-mounting embedded in the body-part of the frame, said body-part by its position relative to said fixed member operating to receive the direct shock of discharge, lifting-jacks mounted in the under side of the body-part of the frame, and means to receive the thrust of the lifting-jacks, the latter when extended operating to transmit the discharge-shock from the body-part of the frame to the thrust-receiving means.

3. In a car for carrying guns of large calibers during transportation and firing, an integral girder-like member of reinforced cement forming the main frame of the car, said frame having an enlarged central body-part projecting downward from the under side of the frame and end-extensions of less thickness than said body-part, wheel-trucks mounted beneath the end-extensions, the fixed member of a gun-mounting embedded in the body-part of the frame, said body-part by its position relative to said fixed member operating to receive the direct shock of discharge, lifting-jacks mounted in the under side of the body-part of the frame, and a platform to receive the thrust of the lifting-jacks, said lifting-jacks when extended operating to transmit discharge-shock from the body-part of the frame to the platform.

4. In a car for carrying guns of large calibers during transportation and firing, an integral girder-like member of reinforced cement forming the main frame of the car, said frame comprising a horizontal platform having longitudinal side-sills projecting below the platform and spaced transverse sills projecting downward from the platform and connecting the longitudinal side-sills, wheel-trucks mounted beneath the frame, the fixed member of a gun-mounting embedded in the frame above the spaced transverse sills, lifting-jacks mounted in the under sides of the spaced transverse sills directly beneath the fixed member of the gun-mounting, and means to receive the thrust of the lifting-jacks, the latter when extended operating to transmit to the thrust-receiving means discharge-shock imparted to the frame by the fixed member of the gun mounting.

5. In a car for carrying guns of large calibers during transportation and firing, an integral girder-like member of reinforced cement forming the main frame of the car, said frame comprising a horizontal platform with a central recess and having longitudinal side-sills projecting below the platform and also having spaced transverse sills projecting downward from the platform across said recess therein and connecting the longitudinal side-sills, wheel-trucks mounted beneath ends of the frame, a bed-plate embedded in the recess in said horizontal platform forming the fixed member of a gun-mounting, lifting-jacks mounted in the under sides of the spaced transverse sills directly beneath the bed-plate, and means to receive the thrust of the lifting-jacks, the latter when extended operating to transmit to the thrust-receiving means the discharge-shock imparted to the frame by the bed-plate.

6. In a car for carrying guns of large caliber during transportation and firing, an integral girder-like member of reinforced cement forming the main frame of the car, said frame having an enlarged central body-part and elevated end-extensions of less thickness than said body-part, wheel-trucks mounted beneath the end-extensions of the frame and carried by the same clear of the central body-part, a pivotal connection between each wheel-truck and the frame consisting of a member embedded in the frame and a pivot on the wheel-truck held in said embedded member, and the fixed member of a gun-mounting embedded in the body-part of the frame, said body-part by its position relative to said fixed member operating to receive the direct shock of discharge.

7. In a car for carrying guns of large calibers during transportation and firing, an integral girder-like member of reinforced cement forming the main frame of the car, said frame having an enlarged central body-part and elevated end-extensions of less thickness than said body-part, wheel-trucks mounted beneath the end-extensions of the frame and carried by the same clear of the central body-part, a pivotal connection between each wheel-truck and the frame consisting of a member seated in a vertical passage extending through the frame and a pivot on the wheel-truck held in said seated member, a lid for closing the upper end of said passage, and the fixed member of a gun-mounting embedded in the body-part of the frame, said body-part by its position relative to said fixed member operating to receive the direct shock of discharge.

In testimony whereof I have signed this specification.

EUGÈNE SCHNEIDER.